United States Patent [19]

Okamoto et al.

[11] Patent Number: 4,777,480
[45] Date of Patent: Oct. 11, 1988

[54] MULTI-SCALE INDICATOR

[76] Inventors: Keiji Okamoto; Isamu Sakurai; Sakae Tsukamoto, all of 7-1, Yokoi 1-chome, Shimada-shi, Shizuoka, Japan

[21] Appl. No.: 893,249

[22] Filed: Aug. 5, 1986

[30] Foreign Application Priority Data

Feb. 7, 1985 [JP] Japan .................................. 60-15275

[51] Int. Cl.⁴ ............................................. G08B 21/00
[52] U.S. Cl. ..................................... 340/688; 340/59; 362/27; 362/30; 350/112
[58] Field of Search ............... 340/59, 688, 815.31, 340/715; 116/286–288, DIG. 5, DIG. 6, DIG. 36, DIG. 37, DIG. 46, DIG. 47; 362/27, 30, 29; 350/110, 112; 324/115

[56] References Cited

U.S. PATENT DOCUMENTS

| 2,837,052 | 6/1958 | Viret | 116/287 |
|---|---|---|---|
| 3,264,769 | 8/1966 | Hardesty | 362/27 X |
| 3,590,773 | 7/1971 | Ruppert | 350/112 X |
| 4,004,546 | 1/1977 | Harland | 116/DIG. 5 |
| 4,174,500 | 11/1979 | Kuga | 324/115 |
| 4,258,643 | 3/1981 | Ishikawa et al. | 116/286 |
| 4,321,655 | 3/1982 | Bouvrande | 362/29 |

FOREIGN PATENT DOCUMENTS 2116717  9/1983  United Kingdom .............. 116/288

Primary Examiner—Joseph A. Orsino
Assistant Examiner—Brian R. Tumm
Attorney, Agent, or Firm—Wigman & Cohen

[57] ABSTRACT

A multi-scale indicator which has a main scale and a sub-scale is constructed so as to prevent a misreading between the main scale and the sub-scale. A sub-scale prism and the light source which illuminates only the sub-scale are light insulated from the main scale prism and the light source which illuminates the main scale, due to the sub-scale prism being securely buried within a circular arc shaped prism receiving groove which is formed on the main scale prism. Light opaque paint is spread between the main scale prism and the sub-scale prism to prevent the occurrence of light leakage therebetween. Also provided is an electrical control for supplying a light to the sub-scale prism only when the pointer is moved to a predetermined zone located on the end of the main scale.

7 Claims, 4 Drawing Sheets

MULTI-SCALE INDICATOR

BACKGROUND OF THE INVENTION

1. Field of the Invention

The present invention relates to a multi-scale indicator and, more particularly, to an improved indicator which includes both a main scale and a sub-scale such as those used in fuel oil meters for automobiles, or the like, which give a subsidiary indication in addition to an ordinary measurement indication.

2. Description of the Prior Art

In recent years, the objects of indicators have diversified with the advance of improvements of functions in automobiles, airplanes and the other machine equipment. As a result, a multi-scale indicator which has a mechanism capable of giving different level indications has generally been utilized.

For example, as shown in FIGS. 1 and 2, there is provided a multi-scale indicator generally employed as a fuel oil meter for use in automobile or the like which comprises a scale disc 1 provided with a main scale 2 and a sub-scale 3 therein. On the top of the scale disc 1, a pointer 4 is provided, while on the back side of the scale disc 1, a main scale prism 5, which is formed as a circular disc shape having a diameter substantially the same as that of the scale disc 1 is disposed. The main scale prism 5 has a recess, and a light source 6 is disposed in the recess. As a light emmanating from the light source 6 can be passed through the main scale prism 5 and is diffusely reflected therein, each scale may thus be brightly illuminated.

The indicator having such a construction described above is operated as follows. The pointer 4 usually indicates the main scale 2. However, the pointer 4 indicates the sub-scale 3 displaying an enlarged value by switchover of the range of the indicator when the pointer 4 is moved to the predetermined warning zone R located in proximity to the end of the main scale 2. Simultaneously with the switchover of the range, a warning lamp A which is located in a lower left portion of the scale disc 1 is lit, clearly showing that the pointer 4 indicates the sub-scale 3.

Specifically, when the pointer 4 is moved to the red-zone R of main scale 2 which indicates that fuel oil will be soon exhausted, an automatic change-over switch (not shown) which is contained in an electrical circuit means of the indicator is operated, and point 4 thus indicates the sub-scale 3 by switchover of the range simultaneously with lighting of the warning lamp A.

However, the driver discriminates visually whether the pointer 4 indicates the main scale 2 or the sub-scale 3 only by observation of the ON-OFF operation of the warning lamp A. Therefore, when the warning lamp A is turned off, the driver sees both the main scale 2 and the sub-scale 3 displayed in the indicator simultaneously. As a result, in the conventional indicator, even if when the warning lamp A is lit, the driver is likely to make a misreading as to whether the pointer 4 indicates the main scale 2 or the sub-scale 3. Further, similar situations have occurred due to the drivers failure to notice that the warning lamp A is lit.

SUMMARY OF THE INVENTION

In view of the above-mentioned disadvantages of the conventional indicator, it is, accordingly, a main object of the present invention to provide a novel and improved multi-scale indicator with the high visibility which makes it possible to drive without misreading the value indicated by the pointer of the indicator.

Another object of the present invention is to provide a multi-scale indicator which makes it possible to discriminate whether the pointer indicates a main scale or a sub-scale clearly, thereby preventing the occurrence of misreading of the indicated value.

A further object of the present invention is to provide a multi-scale indicator in which said sub-scale is illuminated when said pointer is moved to a predetermined zone located in proximity to the end of said main scale.

Still a further object of the present invention is to provide a multi-scale indicator in which said sub-scale is illuminated simultaneously with said main scale being turned off, when said pointer is moved to the predetermined zone.

In order to achieve these objects, the multi-scale indicator of the present invention having a pointer and two scales such as a main scale and a sub-scale comprises a sub-scale prism for illuminating only the sub-scale which is light insulated from a main scale prism for illuminating a main scale.

Specifically, said main scale prism is formed in the circular disc shape having substantially same size as that of a main scale disc, which illuminates the main scale and the pointer. The sub-scale prism, having substantially same size and shape as that of the sub-scale, is securely buried within a prism receiving groove formed on the main scale prism so as to leave a light transmitting passageway thereunder for guiding a light into the pointer. An illumination light can be supplied to the sub-scale prism only when the pointer is moved to the predetermined zone located in proximity to the end of the main scale.

These and other objects, features and advantages of the present invention will be more apparent from the following description of a preferred embodiment, taken in conjunction with the accompanying drawings.

DESCRIPTION OF THE PREFERRED EMBODIMENTS

Figure 1:
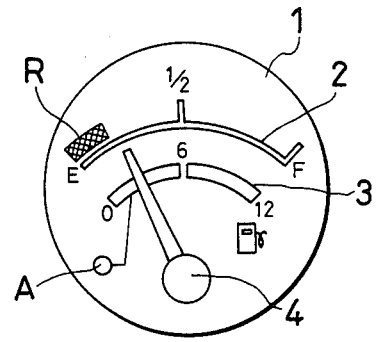
FIG. 1 is a plan view of a conventional multi-scale indicator device.
Figure 2:
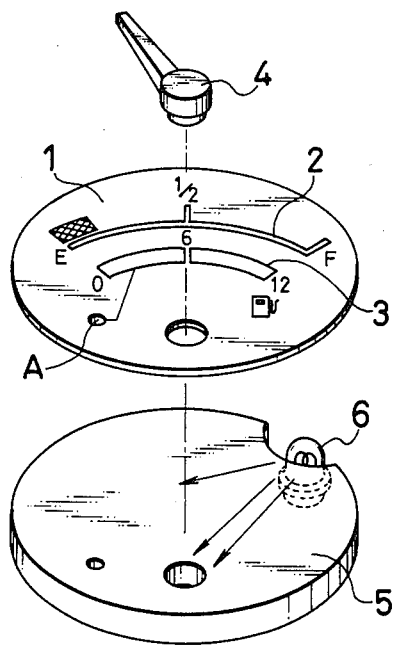
FIG. 2 is a fragmentary perspective view of said conventional multi-scale indicator device.
Figure 3:
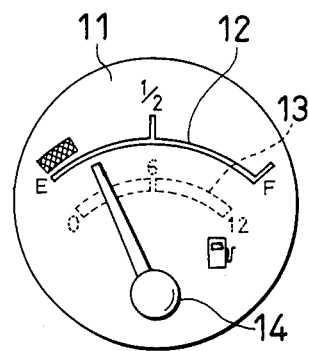
FIG. 3 is a plan view of a preferred embodiment of the present invention.

Referring now to the drawings in greater detail, FIGS. 3 through 6 illustrate a preferred embodiment of multi-scale indicator according to the present invention. Such a multi-scale indicator comprises a scale disc 11 which is provided with a main scale 12 having a circular arc shape and sub-scale 13 having a concentric circular shape to the main-scale 12 spaced a certain distance therefrom. On the front side of such scale disc 11, a pointer 14 which makes it possible to indicate both scales, i.e., the main scale 12 and the sub-scale 13, is provided. Additionally, on the back side of the scale disc 11, a main scale prism 15 with a first light source 16 is provided. At this point, said construction is similar to that of the conventional indicator described above.

Figure 4:
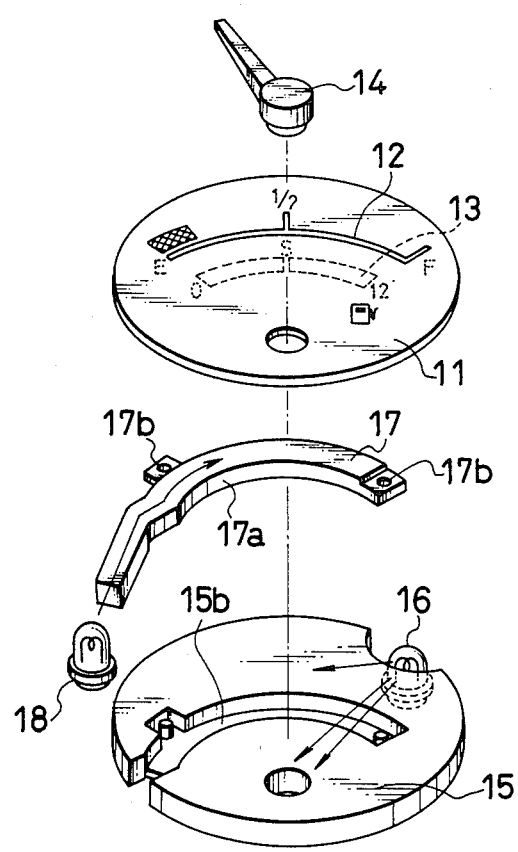
FIG. 4 is a fragmentary perspective view of said preferred embodiment of the invention.
Figure 5:
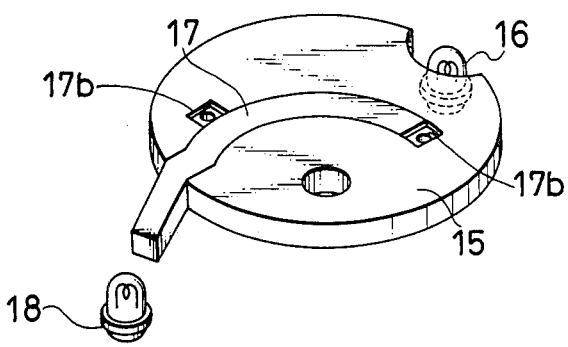
FIG. 5 is an assembled perspective view of a main portion of said preferred embodiment.
Figure 6:
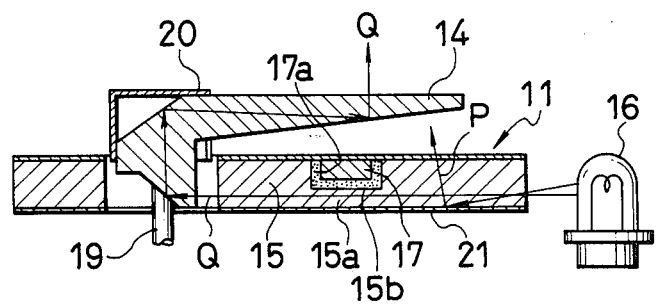
FIG. 6 is an enlarged vertical cross sectional view of FIG. 3.

As also best shown in FIGS. 4 and 6, the multi-scale indicator according to the preferred embodiment comprises a sub-scale prism 17 having a circular arm shape substantially the same as the shape of the sub-scale 13 located on the scale disc 11. A second light source 18 which illuminates only for the sub-scale prism 17 is mounted to the end of the sub-scale prism 17. The sub-scale prism 17 is securely buried within a prism receiving groove 15b which is formed on the front side of the main scale prism 15 so as to leave a light transmitting passageway 15a thereunder for guiding a light from the first light source 16 into the pointer 14. The indicator is constructed in such a manner that the pointer 14 indicates the sub-scale 13 by switchover of the range carried out by means of the circuit means described hereinafter, when the pointer 14 is moved to the predetermined red zone R located in proximity to the end of the main scale 12.

As shown in oblique lines in FIG. 6, on the side walls and the bottom surface of the sub-scale prism 17 are applied opaque black paint so as to prevent the occurrence of a light leakage between the main scale prism 15 and the sub-scale prism 17.

In addition, in order to completely prevent the occurrence of a light leakage between the main scale prism 15 and the sub-scale prism 17, it is preferable to paint the same opaque black paint on the side walls and the bottom surface of the prism receiving groove 15b.

The sub-scale prism 17 has screw mounting holes 17b on the end portion and the middle portion thereof, and is thereby fixedly secured by screws within the prism receiving groove 15b.

Referring to FIG. 6, the pointer 14 is rotatably supported by a rotating shaft 19 and a pointer cap 20 is mounted on the top of a rotating shaft 19. In order to facilitate seeing the pointer 14, it is preferable to guide a light from the first light source 16 into the pointer 14. In the preferred embodiment, as best shown in FIG. 6, the pointer 14 is made from a prism. In connection with this, a reflecting plate 21 made of aluminum material is attached to the back side of the main scale prism 15.

Accordingly, a light derived from the first light source 16 illuminates the main scale 12 since a part of the light is diffusely reflected by the reflecting plate 21 as indicated by an arrow line P. Further, a part of the light passed through the light transmitting passageway 15a is introduced into the pointer 14 as illustrated by an arrow line Q, thereby illuminating it.

Figure 7:
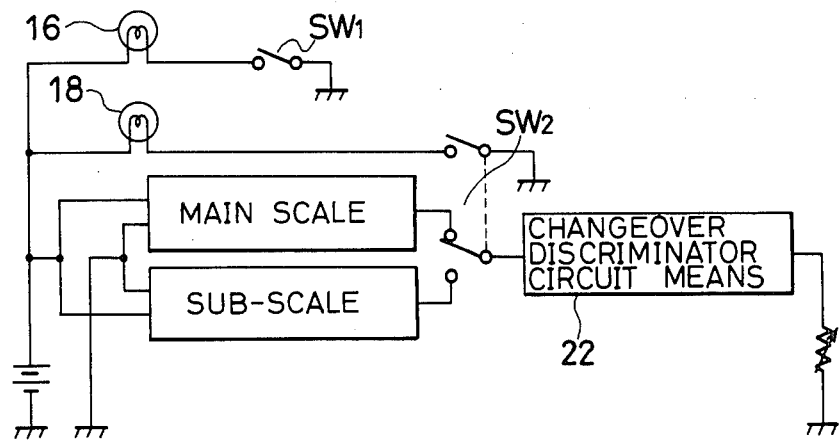
FIG. 7 is a connection block diagram of inner circuit means of said preferred embodiment.

Referring now to FIG. 7, there is illustrated a preferred embodiment of an inner electrical circuit block diagram of the multi-scale indicator according to the present invention. In the embodiment, the sub-scale 13 is illuminated when the pointer 14 is moved to the predetermined red zone R located on the end of the main scale 12.

Specifically, in the inner circuit, the first light source 16 is lit when a switch SW1 is turned on. At the same time, a switch SW2 of changeover discriminator circuit means 22 is changes so as to contact the main scale side, and thereby the pointer 14 indicates the main scale 12. Also, when the pointer 14 is moved to the red zone R, the switch SW2 of changeover discriminator circuit means 22 is changed so as to contact the sub-scale side (i.e. enlarged scale side). Then, the range of the indicator is changed, and the second light source 18 is lit.

In accordance with the above construction, when the pointer 14 indicates the range except for the red zone R of the main scale 12, as best shown in FIGS. 6 and 7, the pointer 14 and the main scale 12 are illuminated by lighting the first light source 16. In this case, the sub-scale 13 can not be seen by the driver since the sub-scale prism 17 is shielded by means of the opaque black paints 17a.

As described above, when the pointer 14 is moved to the red zone R, the switch SW2 is changed, and the second light source 18 is lit simultaneously with a switchover of the scale range. As a result, the sub-scale 13 is brightly displayed by a light passing through the sub-scale prism 17. Thus, it is clearly understood that the pointer 14 indicates the enlarged sub-scale 13. Therefore, a failure to recognize whether the pointer 14 indicates the main scale 12 or the sub-scale 13 can be prevented.

It is preferable that the scale disc 11 for use in this indicator is made of e.g. a smoke polycarbonate plastic. In such a case, the main scale 12 is always observed through day and night. However, the sub-scale 13 can be recognized only when the second light source 18 used for the sub-scale prism 17 is lit.

Also, it is possible to facilitate observation of the indicator by providing a red zone prism like the sub-scale prism 17 in the position on the scale disc 1 corresponding to the red zone R. Specifically, there is provided a red zone prism which is divided as a branch from the sub-scale prism 17 and elongated along the red zone R. As a light source for the red zone prism, the second light source 18 is used in common for the red zone prism and for the sub-scale prism 17.

Figure 8:
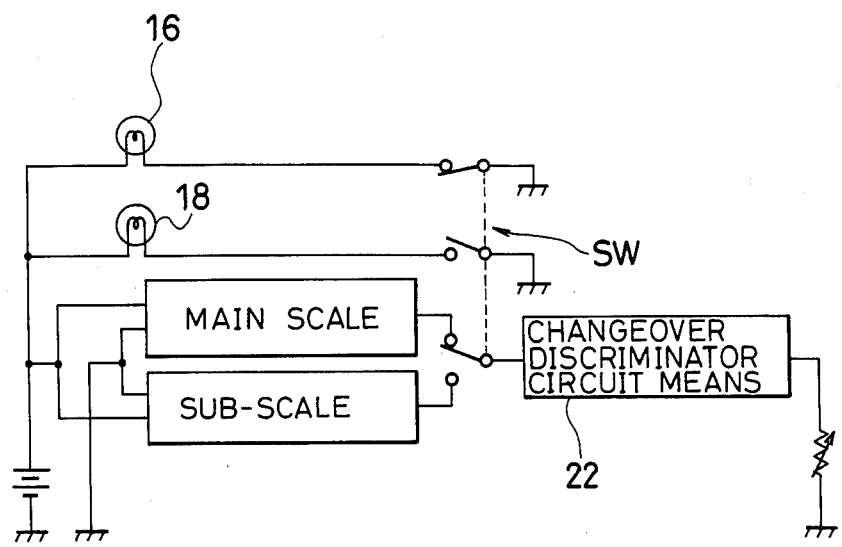
FIG. 8 is a connection block diagram of inner circuit means of another preferred embodiment in accordance with the present invention.

Further, by using a changeover switch means SW of the inner electrical circuit means as shown in FIG. 8, it is possible to construct the indicator in such a manner that when the first light source 16 is turned off, the second light source 18 which is used in the red zone prism and the sub-scale prism 17 is lit. Then, the red zone R and the sub-scale 13 are brightly displayed, thereby preventing misreading of the measured value indicated by the pointer 14 of the indicator.

In this embodiment, similarly to the previously described embodiment, the opaque black paints are applied to the side walls and the bottom surface of the red zone prism so as to prevent the occurrence of a light-leakage between the red zone prism and the main scale prism 15.

In the above embodiments, illumination of the pointer 14 is carried out by the light emitted from the light source 16 used in the main scale prism 15. However, it is also possible that the indicator is provided with a third light source only used in the pointer 14 separately. In this case it is possible to carry out switching operation between the first and second light sources 16, 18 in the state where the pointer 14 is always illuminated.

As will be clear from the foregoing description, the multi-scale indicator to the present invention has a sub-scale prism and its light source especially for use in the illumination of the sub-scale. As a result, a failure to recognize whether the pointer of the device indicates the main scale or the sub-scale can be prevented. Thus, the driver can carry out safe operation of automobiles, air planes or other machine equipment having such a mutli-scale indicator.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A multi-scale indicator comprising:
   a pointer for indicating measured values of the indicator;
   a scale disc having a main scale and a sub-scale;
   a main scale prism for illuminating said main scale by a light derived from a first light source, which is attached to the back side of said scale disc, and said main scale prism having a prism receiving groove formed on said main scale so as to leave a light transmitting passageway thereunder for introducing a light from said first light source into said pointer; and
   a sub-scale prism for illuminating only said sub-scale by a light derived from a second light source, which sub-scale prism is light insulated from said main scale prism and is buried securely within said main scale prism.

2. A multi-scale indicator as set forth in claim 1, wherein said main prism is formed as circular disc shape, and said sub-scale prism is formed as circular arc shape corresponding to the shape of the sub-scale.

3. A multi-scale indicator as set forth in claim 2, wherein said main scale comprises a red zone located near the end of said main scale, and said second light source is adapted to be illuminated only when said pointer indicates said red zone, and then said pointer is adapted for indicating said sub-scale.

4. A multi-scale indicator as set forth in claim 3, wherein said first light source is adapted to be switched off at the same time of illuminating of said second light source, whereby it is possible to securely prevent confusion of the value indicated by said pointer between said main scale and said sub-scale.

5. A multi-scale indicator as set forth in claim 1, wherein the light opaque paint is applied between said main scale prism and said sub-scale prism.

6. A multi-scale indicator as set forth in claim 5, wherein light opaque paint is applied on the side walls and the bottom surface of said sub-scale prism.

7. A multi-scale indicator as set forth in claim 6, wherein light opaque paint is applied around said sub-scale prism receiving groove.

* * * * *